United States Patent [19]

Sherman et al.

[11] Patent Number: 4,557,905

[45] Date of Patent: * Dec. 10, 1985

[54] LEACHING AND WASHING A FLOCCULATED SLURRY HAVING A FIBER CONTENT

[75] Inventors: Michael I. Sherman; Carl L. Elmore, both of Glens Falls, N.Y.; Robert J. Brison, Golden, Colo.

[73] Assignee: Kamyr, Inc., Glens Falls, N.Y.

[ * ] Notice: The portion of the term of this patent subsequent to Feb. 26, 2002 has been disclaimed.

[21] Appl. No.: 649,921

[22] Filed: Sep. 13, 1984

Related U.S. Application Data

[62] Division of Ser. No. 503,178, Jun. 10, 1983, Pat. No. 4,501,721.

[51] Int. Cl.⁴ .............................................. C01G 7/00
[52] U.S. Cl. ...................................... 423/27; 423/29; 423/109; 423/150; 423/578 A; 75/2; 75/3; 75/101 R; 75/105; 75/117; 75/119; 75/118 R; 75/120; 75/121
[58] Field of Search ................. 423/25, 27, 29, 109, 423/150, 578 A; 75/0.5 A, 2, 3, 101 R, 117, 118 R, 105, 119, 120, 121

[56] References Cited

U.S. PATENT DOCUMENTS

| | | | |
|---|---|---|---|
| 2,479,930 | 8/1948 | Herkenhoff et al. | 423/29 |
| 3,151,972 | 10/1964 | Streib | 75/1 |
| 3,788,841 | 1/1974 | Agarwal et al. | 75/103 |
| 4,071,611 | 1/1978 | Chilson et al. | 423/41 |
| 4,174,997 | 11/1979 | Richter | 162/19 |
| 4,256,705 | 3/1981 | Heinen et al. | 423/27 |
| 4,256,706 | 3/1981 | Heinen et al. | 423/29 |

FOREIGN PATENT DOCUMENTS

2085856  5/1982  United Kingdom .

OTHER PUBLICATIONS

Heinen et al. "Enhancing Percolation Rates in Heap Leaching of Gold-Silver Ores" International Bureau of Mines., 1979.
Perry, "Refining Zinc Silicate Ore by Special Leaching Technique" Chemical Engineering, 10/10/66 pp. 182-184.
Mager "Technical and Commercial Aspects of the Refining of Leaching Residues from Zinc Electrolysis", Erznetall, May 1976, pp. 224-229 [Eng. Abs.].
Shoemaker et al. "Recovery of Gold and Silver from Ores" paper to International Precious Metals Institute, 10/23/80.
Sederov "Intensification of Zinc Pulp Settling and Solution Clarifying Through the Use of Flocculants", Yearbook of the Institute of Non-Ferrous Metallurgy, 1978, pp. 22-37. [Eng. Abs.].
Habashi, "Pressure Hydrometallurgy: Key to Better and Nonpolluting Processes "; E/MJ, pp. 96-100 (2/71) and 88-94 (5/71).

Primary Examiner—John Doll
Assistant Examiner—Bob Stoll
Attorney, Agent, or Firm—Cushman, Darby & Cushman

[57] ABSTRACT

Particlized mineral material, such as gold ore, silver ore, or coal, is subjected to a leaching process in a manner to maximize treatment effectiveness even when the particlized mineral material contains small fines. The material is slurried with a flocculating material and fibers, such as cellulosic fibers, fiberglass fibers, or ceramic fibers, and a liquid, and then is passed to the top of a leaching reactor. The slurry is continuously passed downwardly in the reactor while the leaching liquid, such as a cyanide solution, is passed counter-current to the slurry. Leaching liquid is removed from the top of the leaching reactor by a stilling well, and then passed through a carbon adsorber and reintroduced into the reactor. Leached slurry is passed to a continuous washing station, with spent wash liquid from the top of the washing station being utilized as a slurrying liquid for the particlized mineral material.

21 Claims, 3 Drawing Figures

LEACHING AND WASHING A FLOCCULATED SLURRY HAVING A FIBER CONTENT

This is a division of application Ser. No. 503,178, filed June 10, 1983, now U.S. Pat. No. 4,501,721.

BACKGROUND AND SUMMARY OF THE INVENTION

The leaching of constituents from particlized mineral materials is practiced utilizing a wide variety of materials and equipment. Leaching procedures are particularly useful for the recovery of metals from particulized mineral ores, such as gold and silver ores. The dominant process for the extraction of such metals from ores is leaching with alkaline cyanide solution and oxygen, and this basic procedure has changed relatively little since the issuance of the first patent thereon in 1887. Despite extensive use of cyanide leaching, however, it has a number of drawbacks associated therewith, including the practical necessity of either grinding the ore fine for continuous agitation leaching or utilizing batch leading methods on coarser material, significant pollution loads, and minimal adaptability.

According to the present invention a method for the leaching of particlized mineral materials to remove constituents therefrom is provided which has enhanced effectiveness compared to prior art procedures. The method according to the invention is particularly applicable to the removal of metals from metal bearing ores, such as gold and silver ores, but also is adaptable to other processes, such as the removal of the pyritic, organic, and sulfate sulfur compounds present in a solid carbonaceous fuel of the coal or coke type.

The method according to the invention effects the treatment of a slurry of particlized mineral material in a continuous manner, with no large pressure losses and with good metal removal efficiency. The process is capable of treating particlized mineral materials in a continuous manner even where there is a relatively large percentage of small fines (e.g. 200 mesh or below), without channelling and with excellent uniformity of flow. The process according to the invention is easily adaptable to high temperature and/or high pressure conditions, and may be closed to the atmosphere thereby reducing the pollution potential associated therewith. The process also generally requires less grinding equipment and energy and less pumping, agitating, and like energy expenditures compared to prior art continuous leaching processes, can handle ores of a wide variety of sizes, and can handle soft materials—such coke or coal.

Further, by practicing the invention substantially the same results can be achieved as by leaching with carbon added to the "pulp" being leached, without the necessity of adding carbon. This is in part because the retention time for the dissolved metal (e.g. gold) in contact with ore is very short due to countercurrent flow in the reactor vessel of the invention.

The invention also comprises a novel slurry of particlized mineral material, and a method of removing metals from a pregnant leaching solution utilizing a conventional carbon adsorber device.

According to one aspect of the present invention, a particlized mineral material, such as gold or silver ore, is slurried with a liquid. The material is passed downwardly in a generally vertically upstanding leaching reactor vessel, and leaching liquid is passed countercurrently (i.e. upwardly) to the continuously downwardly passing slurry. Treated slurry is continuously removed from a bottom portion of the vessel, while pregnant leaching liquid (with leached constituents, e.g. gold or silver) is continuously removed from the top of the vessel, as by utilizing a stilling well. The leached slurry is continuously washed, preferably in a single stage or in a two stage wash procedure utilizing a vessel or vessels comparable to the leaching reactor. For two stage washing, the spent wash liquid from the first stage of the washing is utilized as the liquid for slurrying the particulized mineral material.

In order to lock the ore particles in a stable network for treatment in the continuous process according to the invention, a flocculating agent and fibers are added to the liquid and particulized mineral material during slurrying thereof. Any suitable conventional flocculant, such as synthetic polymers, may be utilized, and the fibers may be selected from cellulosic fibers (e.g. wood pulp fibers), fiberglass fibers, or ceramic fibers.

The utilization of flocculants and fibers is not restricted to the practice of a continuous process. Rather the formation of a slurry utilizing those materials is also applicable to batch leaching and washing operations, and the like.

The cyanide solution leaching liquid, containing metals removed from particlized ores, is treated in a particular manner to facilitate removal of the metal therefrom. The pregnant leaching solution—that removed from the top of the leaching reactor vessel described above—is passed through a carbon adsorbing device. Fresh carbon is added periodically to the top of the device and loaded carbon removed from the bottom, and effluent from the carbon adsorption device is recycled to the washing or leaching stage.

It is the primary object of the present invention to provide for the effective removal of predetermined constituents from a particlized mineral material. This and other objects of the invention will become clear from an inspection of the detailed description of the invention, and from the appended claims.

BRIEF DESCRIPTION OF THE DRAWINGS

FIG. 3 is a detail cross-sectional schematic view of an alternative form that a leaching reactor vessel could take for the practice of a method according to the present invention.

DETAILED DESCRIPTION OF THE DRAWINGS

Figure 1:
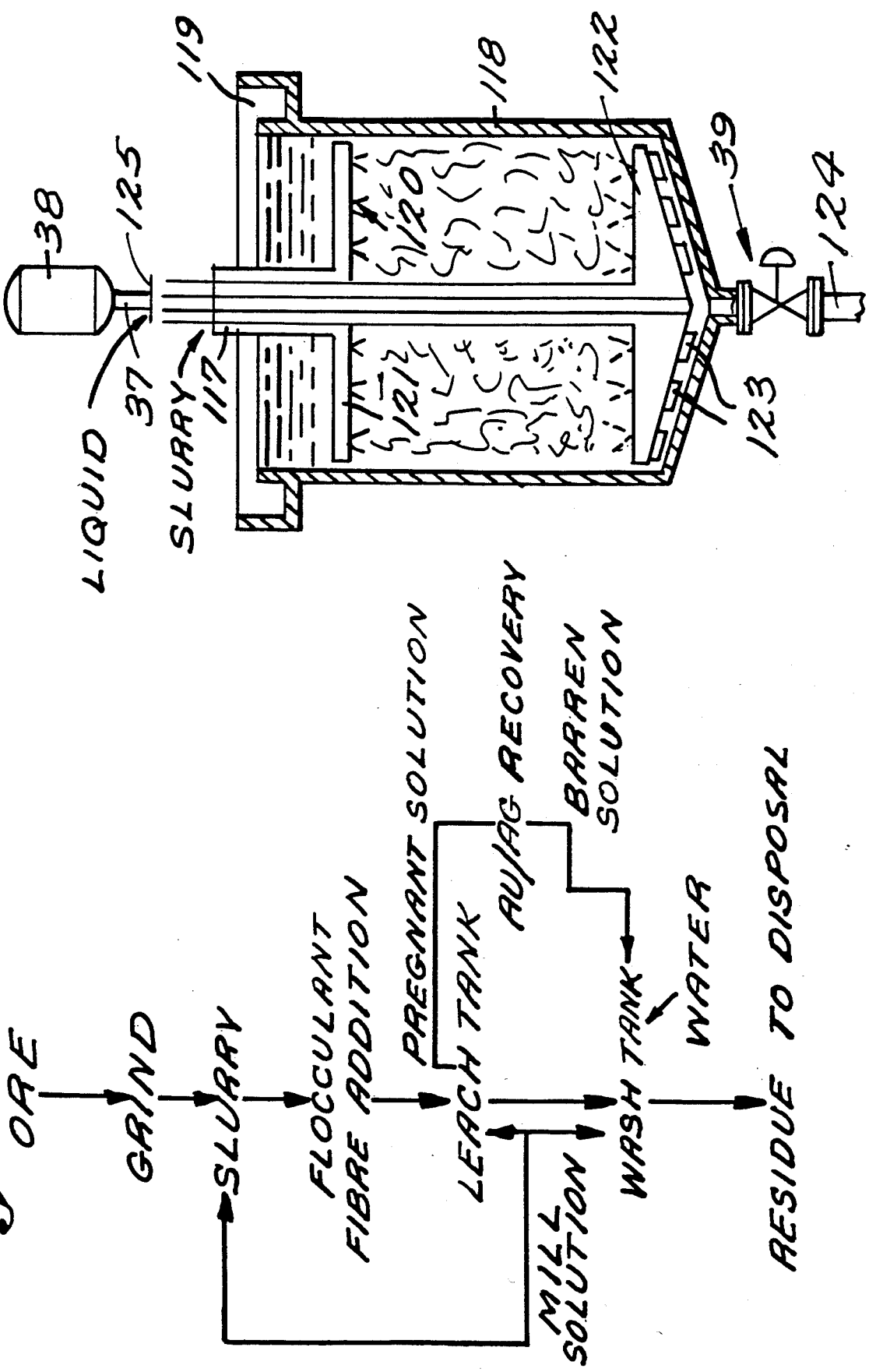
FIG. 1 is a flow sheet illustrating the practice of a method according to the present invention for the treatment of gold or silver ore.

A flow sheet illustrating practice of an exemplary method according to the present invention is provided as FIG. 1 of the drawings. While the invention will be primarily described with respect to the removal of gold or silver from gold and silver ores, it is to be understood that the invention has broader applicability, and is applicable to a wide variety of particlized mineral materials to be treated with a leaching liquid. For instance, the invention is utilizable with a wide variety of metal bearing ores (such as copper and zinc ores), as well as for the removal of pyritic, organic and sulfate sulfur compounds from coal or the like.

According to the invention as illustrated in FIG. 1, the ore is first crushed or ground and then slurried, with flocculants and fibers added to the slurry to lock ore particles in a stable network. The slurry is passed to a leach tank for counter-current flow treatment with a leaching liquid. The pregnant solution is passed to a station for metal recovery, while the leached slurry is passed to wash tanks, with the residue passed to a tailings pond, or like disposal area.

Figure 2:
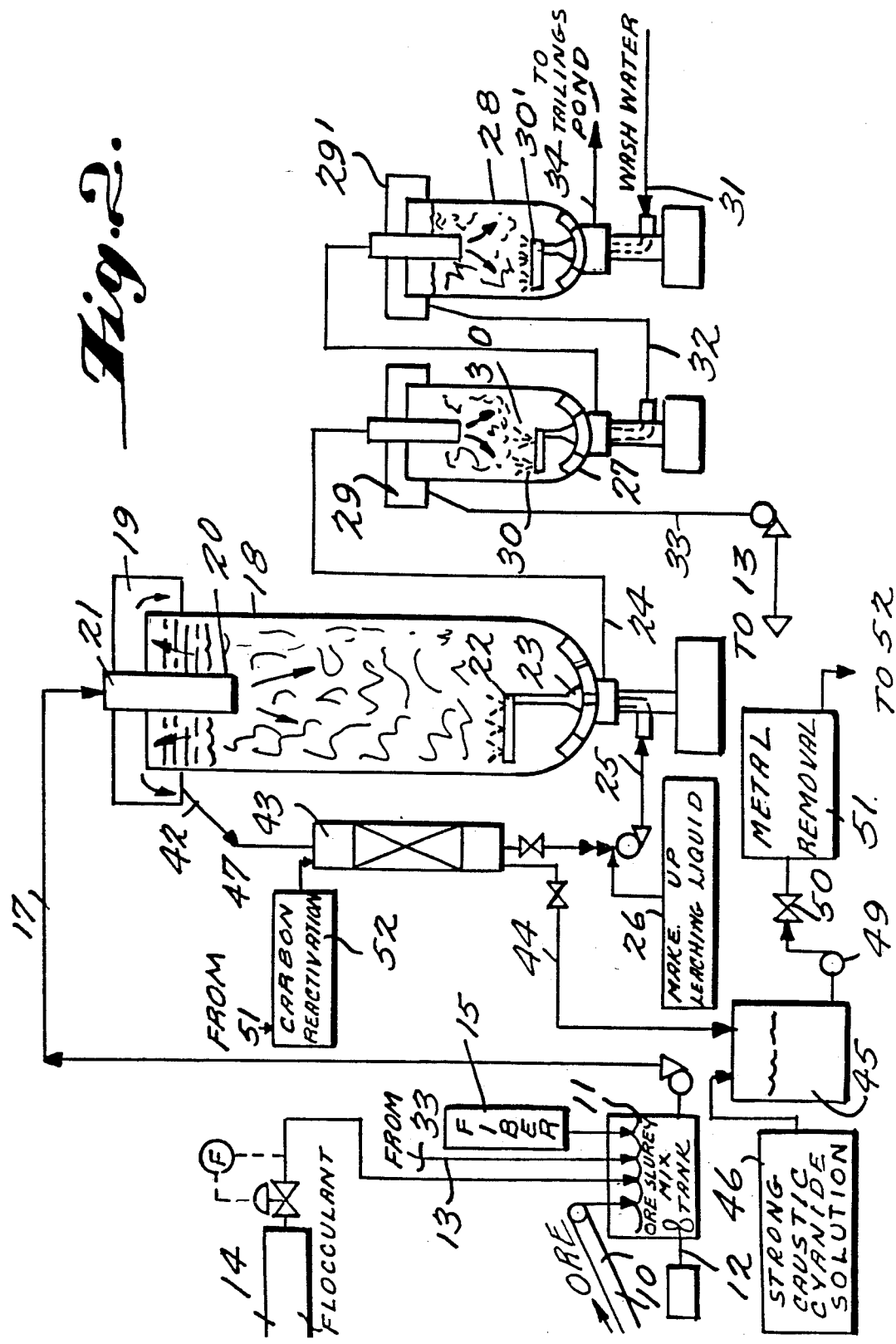
FIG. 2 is a schematic illustration of exemplary apparatus utilizable for the practice of a method according to the present invention.

FIG. 2 schematically illustrates equipment that may be utilizable for the practice of the novel aspects of the process illustrated by the flow sheet of FIG. 1. The particlized ore is passed by conveyor 10 or the like to the slurrying tank 11, which may include a conventional mixing means 12. A slurrying liquid is added to the tank 11 from line 13, the liquid in line 13 preferably comprising water and/or the spent wash liquid from one or more washing stages to be hereinafter described.

Also added to the slurry tank 11 is a flocculant from source 14, and fibers from source 15. The flocculant and fibers may be any suitable flocculant or fibers that are capable of locking ore particles, including fines, in the slurry in a stable network so that they may be subsequently subjected to the leaching treatment. Typical flocculants comprise synthetic polymers of anionic, cationic or nonionic types, and typical fibers comprise cellulosic fibers, fiberglass fibers, ceramic fibers, and combinations thereof.

The slurry from tank 11 is passed through line 17 to the top of a substantially vertically elongated leaching reactor vessel 18. The vessel may be of a type as disclosed in U.S. Pat. Nos. 4,061,193 or 4,174,997, having a "stilling well" structure 19 at the top thereof above the slurry introducing point 20 of a slurry introduction tube 21, and having a rotating liquid introducing device 22 at the bottom thereof, preferably commonly rotatable with slurry discharge structure 23.

The slurry flows continuously downwardly in vessel 18, and is ultimately discharged through line 24 at a bottom portion of the vessel 18. Leaching liquid is introduced through line 25—as from source 26—so that it flows to the distributor 22, and then flows upwardly in vessel 18—counter-currently to the slurry flow therein. The fibers and flocculant in the ore slurry lock the ore particles in a stable network so that leaching can occur without channelling, and with a minimal pressure drop over the vessel 18. Thus fines of 200 mesh, or smaller, can be handled without substantial difficulty. Additionally, ores having particle sizes up to ⅜ inch mesh, or even larger, may be handled at the same time that the fines are being handled.

The leached slurry withdrawn in line 24 passes to a washing station. At the washing station, preferably a single washer 27 is provided, although a first washer (27) and a second washer 28 (or more) may be provided. The vessels 27, 28 are substantially identical to the vessel 18, but generally of smaller size, and include a stilling well arrangement 29, 29' at the top thereof, and a rotating liquid introducing structure 30, 30' at the bottom thereof. Where two vessels are utilized, clean wash water enters vessel 28 through line 31, passes through liquid distributor 30' counter-current to the slurry flow in vessel 28, and spent wash liquid is withdrawn from the stilling well 29' through line 32, to be used as feed wash liquid for the first wash vessel 27. Spent wash liquid in vessel 27 withdrawn from stilling well 29 through conduit 33 preferably is passed to the slurrying tank 11, providing a liquid feed to line 13. The washed slurry is withdrawn from second wash tank 28 through line 34, and is passed to a tailings pond, or like disposal site.

Where only a single wash vessel 27 is utilized, line 31 is connected to structure 30, and line 32 to the tailings pond or the like.

An alternative form the leaching reactor 18 of FIG. 2 may take is illustrated in FIG. 3, with functionally related components in the two embodiments illustrated by the same reference numeral, only the reference numeral being preceded by a "1" in FIG. 3. The form of vessel 118 may, of course, be utilized for the wash vessels 27, 28, also.

For the vessel 118, the slurry feed and the treatment liquid feed are preferably provided in concentric tubes 125, 117. The tube 117 is connected to rotating slurry introducing device 121, which introduces slurry at level 120 below the overflow launder or stilling well 119 provided at the top of the vessel 118.

The liquid introduction pipe 125 is operatively connected to the liquid distributing device 122 at the bottom of the vessel 118, with paddles or like slurry discharge mechanism 123 provided on the bottom of the vessel 122. Note that in this embodiment the structures 121, 122 are rotated by a common shaft 37 connected up to a conventional drive motor 38. A discharge control valve 39 may be provided in the line 24 so that the vessel 118 may be utilized for batch operations, as well as for continuous operations, and to control the rate of solids removal.

Returning to FIG. 2, a method for facilitating removal of the metals from the pregnant leaching solution withdrawn from the stilling well 19 will now be described.

Pregnant leaching solution is withdrawn from stilling well 19 through line 42, and passes to the carbon adsorbing device 43, ultimately passing to line 25.

Operatively connected to the device 43 via line 44 is the storage tank 45, which is adapted to store strong leaching solution therein. The invention is particularly applicable to the leaching of gold and silver ores, in which case the leaching liquid from source 26 comprises a caustic cyanide solution, such as sodium cyanide, and the solution in tank 45 is supplied from a source 46 of hot caustic cyanide solution. Fresh carbon is periodically added to the top of device 43 via line 47 and loaded carbon is withdrawn from the bottom through line 44 and dumped into tank 45.

From tank 45, caustic and carbon are periodically passed by pump 49 through valve 50 to metal removal station 51. From metal removal station 51 carbon is passed to carbon reactivation station 52 to supply fresh carbon, through line 47, to device 43 as needed.

Operation

An exemplary method of operation of the apparatus of FIG. 2, in the practice of an exemplary method according to the present invention, will now be described.

Particlized gold ore is fed by conveyor 10 to tank 11, to which liquid from line 13, polyall flocculant from line 14, and cellulosic fibers from line 15 are added. Sufficient fibers are added so that they comprise between about 0.01 percent and 10 percent, by weight, of the total slurry, preferably about 0.05–0.75%.

The slurry is continuously mixed in tank 11, and then is continuously pumped through line 17 to enter tube 21 of the vessel 18, and continuously passed downwardly therein. Sodium cyanide leaching liquid is introduced through line 25 and distributing device 22 to continuously flow counter-current to the slurry in vessel 18, and pregnant leaching liquid is removed from the stilling well 19—without the necessity for utilizing screens—in line 42.

The pregnant solution in line 42 passes through the carbon adsorber device 43, and then is recirculated through line 25 to the device 22. Fresh carbon is supplied to, and loaded carbon removed from, device 43 as necessary.

Leached slurry is discharged by device 23 from the bottom of the vessel 18 into line 24, and passes to the top of washing stage 27. The slurry flows downwardly through washing stage 27, and then may be fed to the top of vessel 28, and ultimately passes through discharge 34 to a disposal site. Wash water introduced in line 31 to vessel 28 flows counter-currently to the slurry, and the spent wash liquid withdrawn from line 33 is pumped to the slurry in tank 11.

Utilizing the equipment illustrated in FIGS. 2 and 3, it is easy to adapt the process to high temperature and high pressures, thus providing versatility in the processes which may be practiced, and in the available leaching liquids. Also, the process can be closed to the atmosphere thereby minimizing discharges of pollutants into the atmosphere. Because little agitation of the slurry is necessary (only that small amount provided in tank 11), energy requirements are minimized, and the process is readily adaptable to the handling of "soft" particlized mineral materials, such as coal. Further, the process can be operated in a continuous manner even when a relatively high percentage of fines, including small fines, are present, and may be practiced with particles up to about ½ inch in diameter.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of treating particlized metal bearing ore to effect removal of the metal therefrom, comprising the steps of:
   (a) forming a slurry from the particlized ore, liquid, a flocculating agent, and fibers, the flocculating agent and fibers causing the particlized mineral material to be locked in a stable network;
   (b) subjecting the slurry to treatment with a leaching liquid; and
   (c) removing the metal from the leaching liquid after treatment of the slurry.

2. A method as recited in claim 1 wherein the fibers are selected from the group consisting essentially of cellulosic fibers, fiberglass fibers, ceramic fibers, and mixtures thereof, the fibers comprising about 0.01 percent to 10 percent, by weight, of the slurry.

3. A method as recited in claim 2 wherein the flocculant is selected from the group consisting essentially of synthetic polymers of anionic, cationic, and non-ionic types.

4. A method as recited in claim 1 wherein the leaching liquid in step (b) is a cyanide solution.

5. A method as recited in claim 1 wherein the flocculant is selected from the group consisting essentially of synthetic polymers of anionic, cationic, and non-ionic types.

6. A method of removing metal from particlized metal bearing ore, utilizing a treatment vessel, comprising the steps:
   (a) mixing the ore with a liquid to form a liquid slurry, and with a floccuating material so as to hold the ore in a stable network;
   (b) continuously passing the slurry downwardly in the vessel;
   (c) continuously passing a leaching liquid, capable of leaching the metal from the ore, upwardly in the vessel, counter-current to the slurry passage, to remove metal from the ore of the slurry;
   (d) continuously removing the treated slurry from a bottom portion of the vessel; and
   (d) continuously removing pregnant leaching liquid, with removed metal therein, from a top portion of the vessel.

7. A method as recited in claim 6 comprising the further step (f) of continuously washing the slurry removed in step (d).

8. A method as recited in claim 7 wherein step (f) is practiced utilizing a washing vessel, and by passing wash liquid upwardly in the vessel counter-current to slurry moving downwardly in the vessel, with spent wash liquid removed from a top portion of the vessel and washed slurry removed from a bottom portion of the vessel.

9. A method as recited in claim 6 wherein step (a) is further practiced by adding fibers to the particlized ore and slurrying liquid so as to facilitate locking the particlized ore in this stable network.

10. A method as recited in claim 9 wherein the flocculent is selected from the group consisting essentially of synthetic polymers of anionic, cationic, and non-ionic types; and wherein the fibers are selected from the group consisting essentially of cellulosic fibers, fiberglass fibers, ceramic fibers, and mixtures thereof; and wherein the fibers comprise about 0.01%–10%, by weight, of the slurry.

11. A method as recited in claim 6 wherein the leaching liquid in step (c) is a cyanide solution.

12. A method as recited in claim 11 comprising the further step of: (g) continuously passing pregnant liquid withdrawn in step (e) through a carbon adsorbing device, and reintroducing the liquid into the vessel as leaching liquid for step (c).

13. A method as recited in claim 6 wherein step (a) is further practiced by adding fibers to the particlized mineral material and slurrying liquid so as to facilitate locking the particlized mineral material in a stable network.

14. A method as recited in claim 6 wherein the flocculent is selected from the group consisting essentially of synthetic polymers of anionic, cationic, and non-ionic types.

15. A method of removing metal from particlized metal bearing ore, utilizing a treatment vessel, comprising the steps:
   (a) mixing the ore with a liquid to form a liquid slurry, and with fibers so as to facilitate locking of the ore in a stable network;
   (b) continuously passing the slurry downwardly in the vessel;
   (c) continuously passing a leaching liquid, capable of leaching the metal from the ore upwardly in the vessel, counter-current to the slurry passage, to remove metal from the ore of the slurry;

(d) continuously removing the treated slurry from a bottom portion of the vessel; and (e) continuously removing pregnant leaching liquid, with removed metal therein, from a top portion of the vessel.

16. A method as recited in claim 15 comprising the further step (f) of continuously washing the slurry removed in step (d).

17. A method of removing sulfur compounds from particlized coke or coal, utilizing a treatment vessel, comprising the steps:

(a) mixing the coke or coal with a liquid to form a liquid slurry, and with fibers and a flocculating material so as to hold the coke or coal in a stable network;

(b) continuously passing the slurry downwardly in the vessel;

(c) continuously passing a leaching liquid, capable of leaching sulfur compounds from the particlized coke or coal upwardly in the vessel, counter-current to the slurry passage, to remove sulfur from the particlized coke or coal of the slurry;

(d) continuously removing the treated slurry from a bottom portion of the vessel; and (e) continuously removing pregnant leaching liquid, with removed sulfur compounds therein, from a top portion of the vessel.

18. A method as recited in claim 17 comprising the further step (f) of continuously washing the slurry removed in step (d).

19. A method as recited in claim 17 wherein the flocculent is selected from the group consisting essentially of synthetic polymers of anionic, cationic, and non-ionic types; and wherein the fibers are selected from the group consisting essentially of cellulosic fibers, fiberglass fibers, ceramic fibers, and mixtures thereof; and wherein the fibers comprise about 0.01%–10%, by weight, of the slurry.

20. A method of treating particlized coal or coke to effect removal of sulfur compounds therefrom, comprising the steps of:

(a) forming a slurry from the particlized coal or coke, liquid, a flocculating agent, and fibers, the flocculating agent and fibers causing the particlized coal or coke to be locked in a stable network;

(b) subjecting the slurry to treatment with a leaching liquid; and (c) removing the sulfur compounds from the leaching liquid after treatment of the slurry.

21. A method as recited in claim 20 wherein the fibers are selected from the group consisting essentially of cellulosic fibers, fiberglass fibers, ceramic fibers, and mixtures thereof, the fibers comprising about 0.01 percent to 10 percent, by weight, of the slurry.

* * * * *